Dec. 18, 1945. C. C. BELL ET AL 2,390,980
GUN SIGHTING DEVICE
Filed May 11, 1942   5 Sheets—Sheet 3
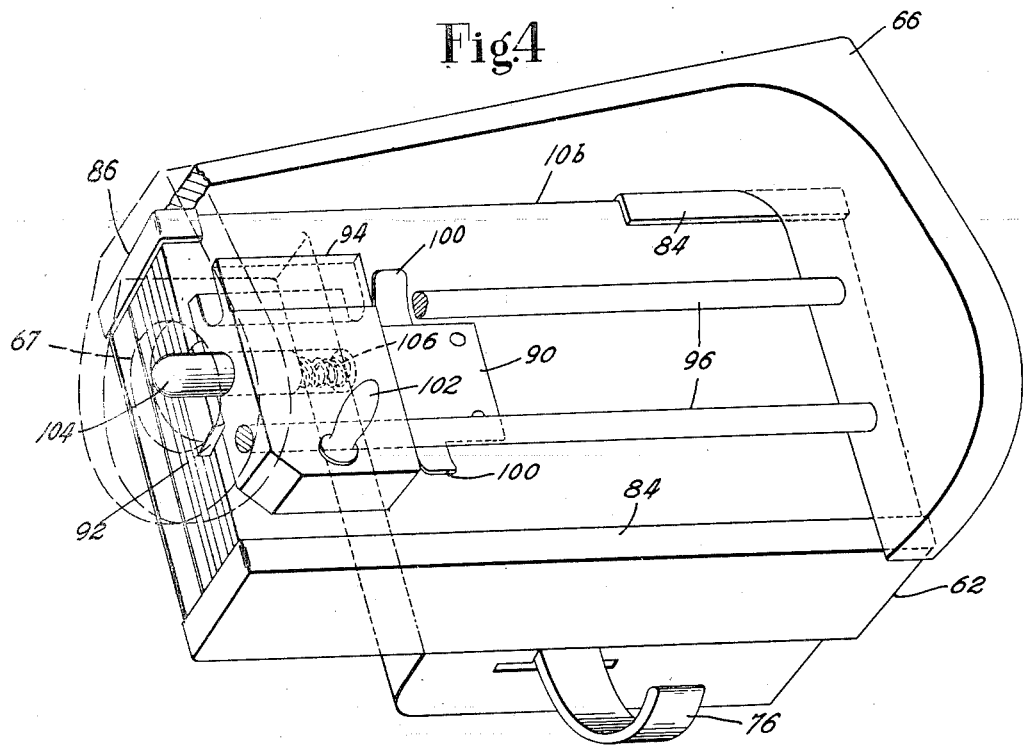
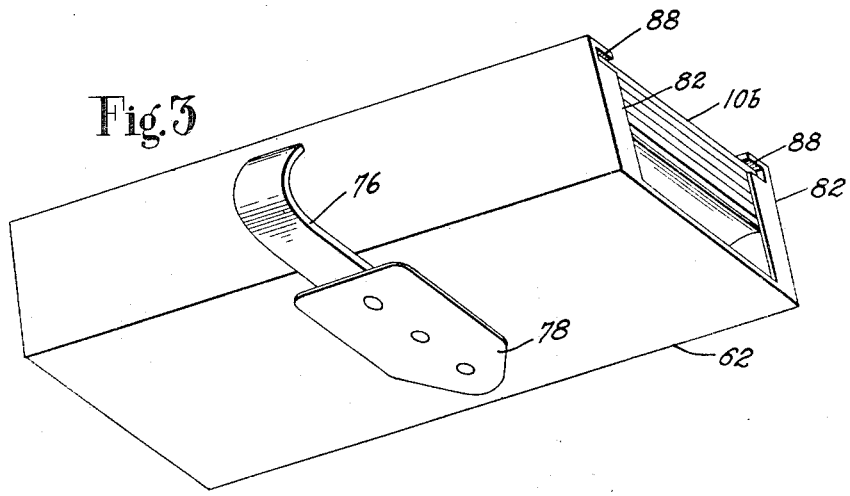

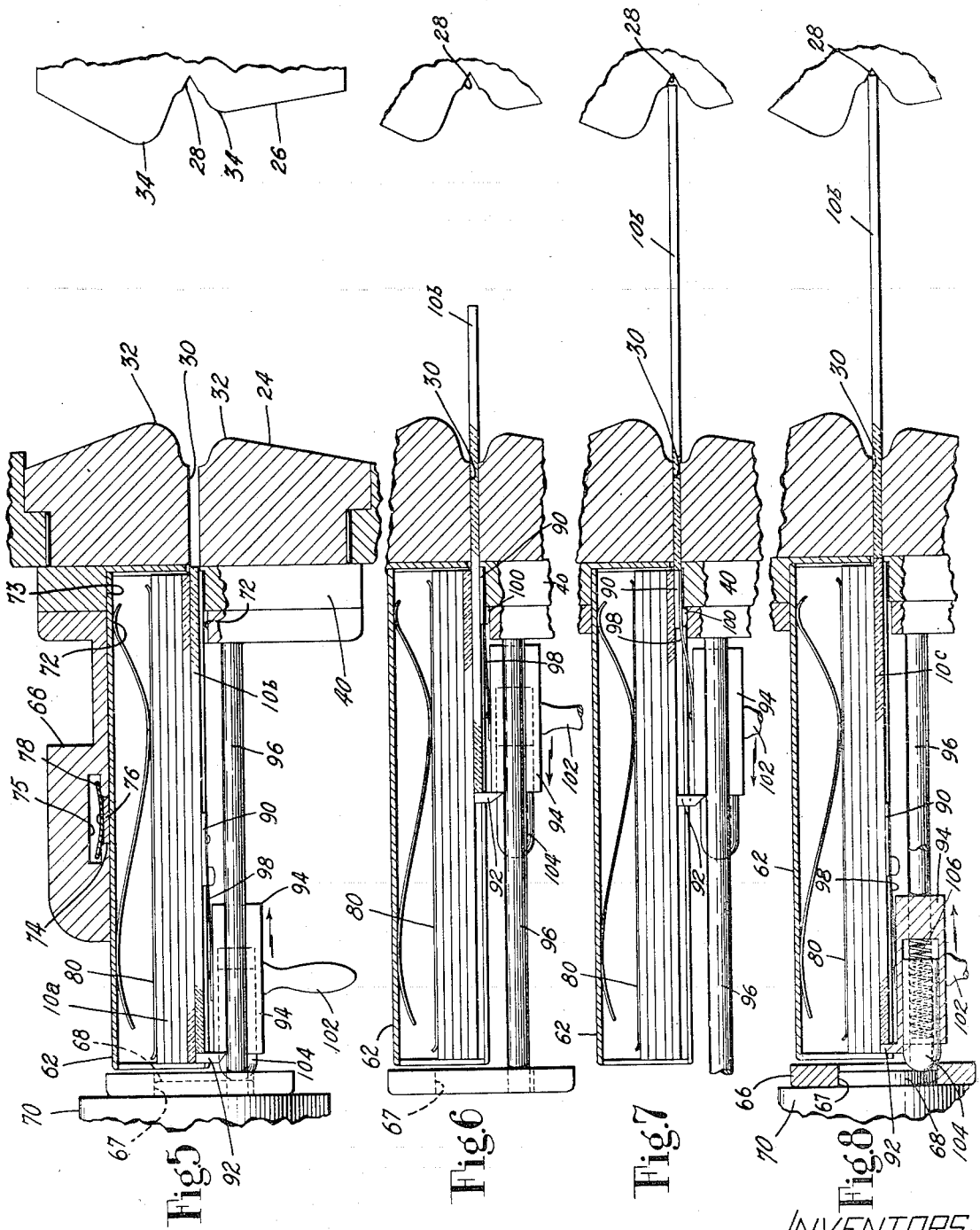

Dec. 18, 1945.   C. C. BELL ET AL   2,390,980
GUN SIGHTING DEVICE
Filed May 11, 1942   5 Sheets-Sheet 5

INVENTORS
Charles C. Bell
William V. Goodlin
Merritt Colby

Patented Dec. 18, 1945

2,390,980

UNITED STATES PATENT OFFICE 2,390,980

GUN SIGHTING DEVICE

Charles C. Bell, Marblehead, and William V. Goodhue, Ipswich, Mass., assignors to United Shoe Machinery Corporation, Flemington, N. J., a corporation of New Jersey Application May 11, 1942, Serial No. 442,512

20 Claims. (Cl. 89—41)

This invention relates to viewing devices and more particularly to that type of indirect vision device which is commonly mounted in the walls of armored enclosures or turrets in tanks or battleships, or the like, to provide protected vision for observers or gunners therein. Such indirect viewing devices are often known as "protectoscopes" and, in general, comprise a periscopic viewing system, means for altering the field of view of such system, and means for protecting the observer against enemy fire.

In many previous viewing devices of this general type, the field of view has been seriously limited, particularly as to elevation. In others, an extended, vertical field of view has been obtained but only at the expense of requiring considerable movement of the observer within the turret. In the use of viewing devices of either of these types, it is necessary for the observer to maintain a fixed position relatively to the device long enough to train a gun properly on a sighted target. This is particularly difficult especially in tanks when passing over rough terrain. Moreover, movement of the observer for the purpose of altering his field of view is undesirable in view of the cramped quarters prevalent in the usual turret or armored enclosure and, furthermore, such movement would interfere with the performance of other duties by the observer and reduce his general efficiency.

In periscopic viewing devices, at least one reflecting element is necessarily more or less exposed to enemy fire. Consequently, one well-directed shot, or even a chance shot, can render the whole device useless by destroying the exposed reflecting element. Another incident of the use of periscopic viewing devices is the necessity for a slit or other opening in the armored wall. The operator is thus exposed to injury from missiles entering directly through the opening or from spatter caused by projectiles striking around the edges of the same. These two disadvantages are serious enough to render periscopic vision devices unsuitable for combat use unless steps can be taken to overcome them.

Accordingly, it is an object of the present invention to provide a protectoscope which may be used to examine an extended vertical field of view without requiring movement relatively to the turret or any part of the device on the part of the observer.

It is a further object of the invention to provide a protectoscope the exposed elements of which may be easily replaced by the observer whenever necessary, the operator being protected while changing the reflecting elements and at all other times from injury by enemy fire.

An additional object of the invention is the provision of a protectoscope which may be used for the accurate aiming of turret-mounted guns.

In accordance with these objects, the invention in one aspect provides, in a turret having a gun mounted for swinging movement about a trunnion axis, the combination with said gun of a periscopic viewing device fixed in the turret and having its line of sight in predetermined relation to the gun, said device comprising a first reflecting element, herein illustrated as a mirror, mounted outside the turret, rotors for mounting said mirror, said rotors being rotatable about an axis parallel to the trunnion axis of said gun, a second reflecting element, means herein illustrated as a chain and sprocket mechanism operatively connected with said gun for turning said rotors through an angle equal to one-half the angle of swinging movement of said gun about its trunnion axis, and means constructed and arranged to engage said mirror and to move it from within the turret into said rotors, said rotors being arranged, during the mirror-inserting operation, to support said mirror in target reflecting position.

To provide for the insertion of a reflecting element into target reflecting position, one of said rotors has a slot providing a passage through which the reflecting element is transferred from within to without the armored enclosure.

In accordance with a further feature of the invention, the illustrated turret is provided with means for supporting a magazine of reflecting elements within the turret and means located within the turret for selecting a reflecting element from said magazine and transferring it into target reflecting position. In accordance with another feature of the invention, automatic means is provided for transferring a reflecting element from said magazine into target reflecting position, said automatic means comprising mirror engaging rolls and a spring for operating said rolls, thereby to insert a mirror through the slotted rotor and into target reflecting position.

To help the gunner to hold his head in target sighting position when the vehicle is in motion, the invention, in another aspect thereof, contemplates the provision of a head rest for supporting the head of the gunner, a carrier on which said head rest is secured, a rod on which said carrier is mounted for bodily sliding movement in opposite directions widthwise of the viewing device and for tipping movement toward and from said device, and means for locking said carrier against bodily sliding movement, said locking means being characterized by relatively movable binding surfaces arranged to be brought into binding engagement with each other in any position of the carrier widthwise of the viewing device by such tipping movement of the carrier.

The above and other features of the invention will be described in the following detailed specification and pointed out in the claims.

In the drawings,

Fig. 3 is a perspective view of a mirror-containing magazine;

Fig. 4 is a perspective view looking from below and showing the magazine in position in its supporting frame, and illustrating also details of the mirror-feeding mechanism;

Figs. 5 through 8 are sectional views of rotors for supporting the mirror and the mechanism for feeding the mirror, the parts of the feeding mechanism and the mirrors being shown in the different successive positions they assume during the feeding cycle;

Fig. 11 is a detail view of the support structure for the head clamp of the sighting device.

Although the invention is hereinafter described and shown in its application to the aiming of a turret-mounted gun, it will be understood that the improved protectoscope may be used independently of any gun for observation purposes.

Figure 1:
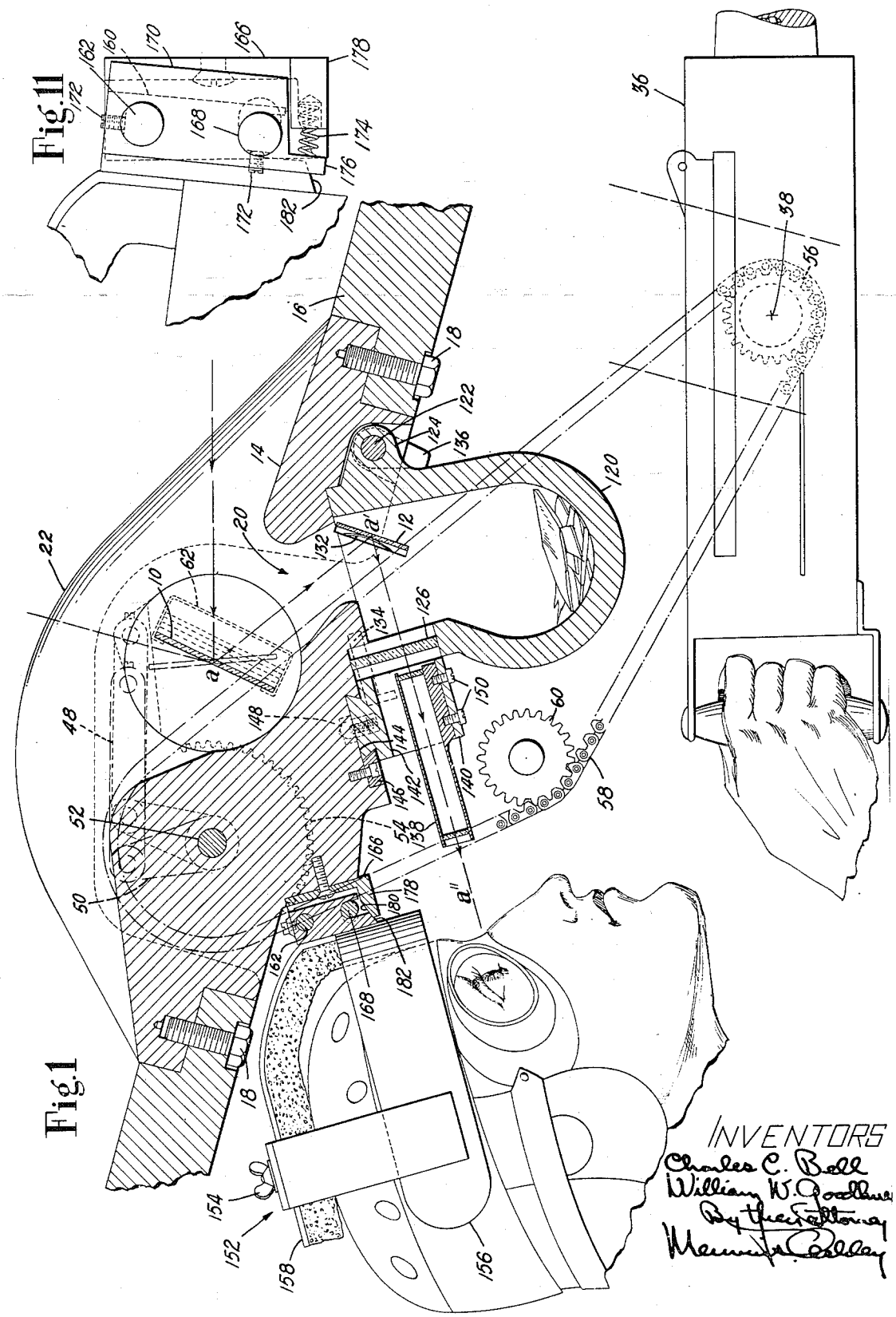
Fig. 1 is a view partly in side elevation and partly in section of a viewing device embodying features of the invention.
Figure 2:
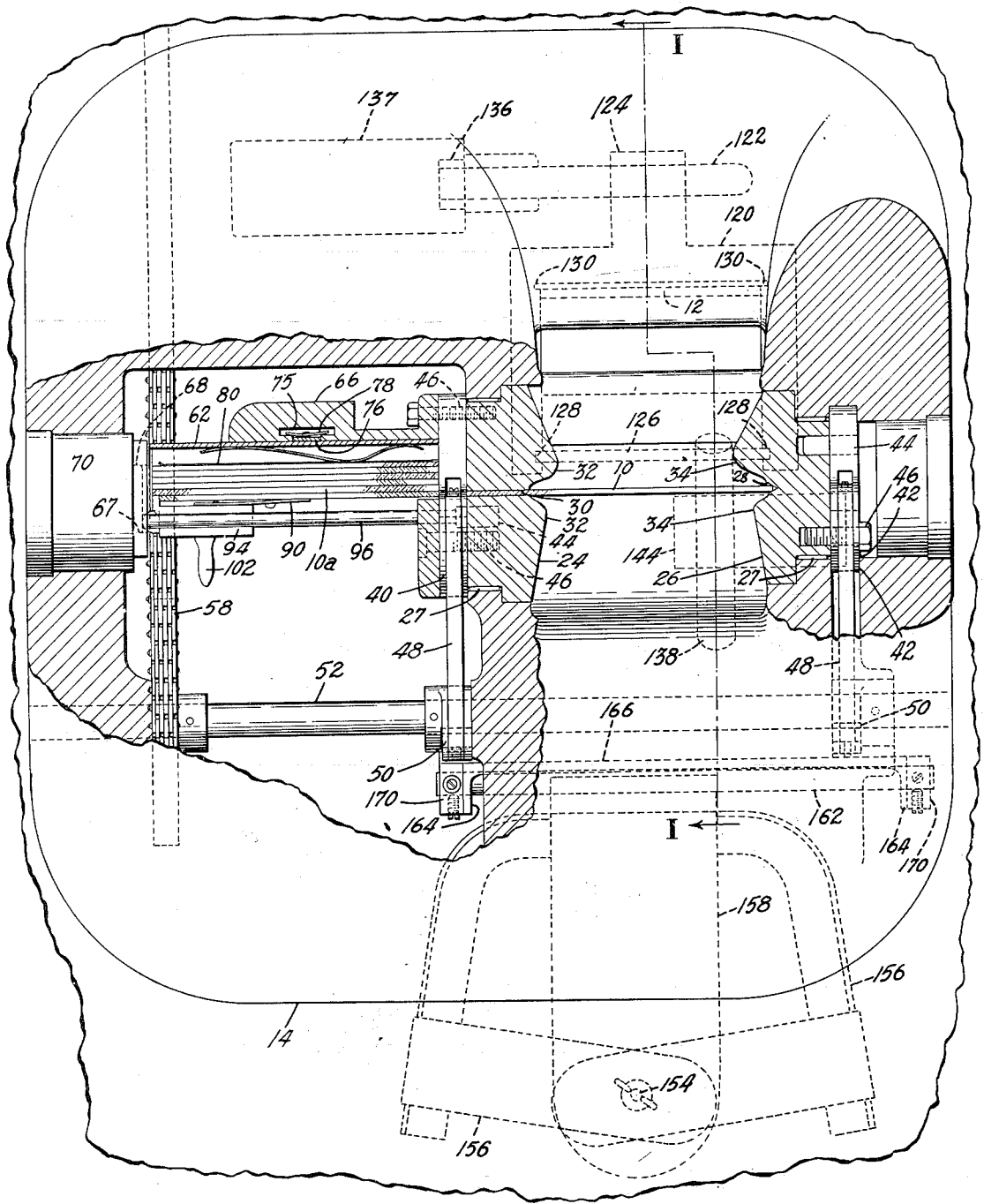
Fig. 2 is a plan view of the viewing device or protectoscope shown in Fig. 1, certain portions of the device being broken away to show more clearly details of the operating mechanism.
Figure 9:
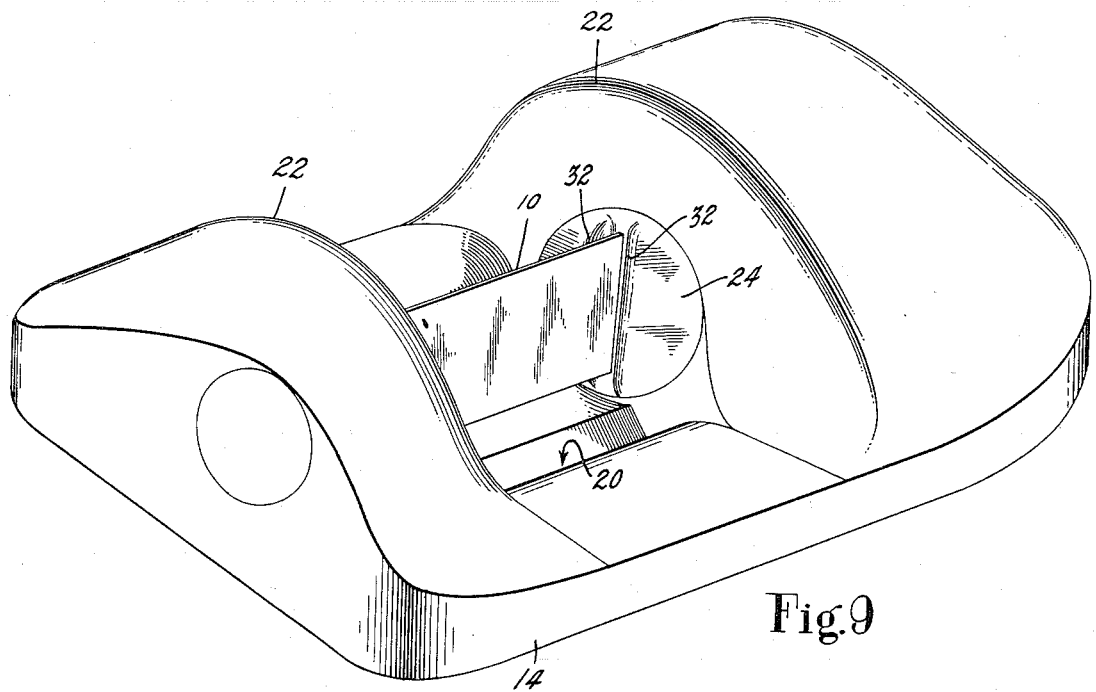
Fig. 9 is a perspective view of the viewing device looking from the outside, showing the shape of the wall portions and the location of the rotors relatively to a viewing slit.

The optical system of the improved protectoscope comprises, in general, a plurality of reflecting elements arranged to form a periscopic viewing device. One or more of these reflecting elements is movable to alter the field of view of the device. The reflecting elements may be prisms, or the like, or mirrors, although the latter are preferable for the purposes of the present invention because of their relatively low cost and the ease with which they may be stored or handled. In the illustrated construction, the optical system comprises a pair of plane mirrors 10 and 12. These mirrors as well as the other elements of the protectoscope are mounted on and supported by an armored casting 14 having a flanged periphery. This casting (Figs. 1, 2 and 9) is received in a flanged port in the wall 16 of a tank turret. The two flanges cooperate properly to position the casting, and a plurality of studs 18 secure the casting flanges together to hold it in place. The casting 14 is shaped as shown particularly in Figs. 1 and 9, and is provided with a viewing slit 20, the ends of which are defined by outwardly bulging end portions 22 of the casting which serve to reduce the probability of missiles entering the tank through the viewing slit. The upper mirror is supported between the inner walls of the end portions 22 and below the outer face of the end portions by rotors 24 and 26 mounted in the end portions. It will be evident that the bulging end portions serve also, to a certain degree, to protect the mirror from enemy fire. The rotors, preferably of cast steel, are mounted in roller bearings 27 in opposite walls of the end portions above the viewing slit 20. These rotors are mounted in axial alinement and means, hereinafter described, are provided for rotating them in synchronism. A diametrically disposed groove 28 is formed in the outer face of the rotor 26, and a diametrically disposed slot 30 extends through the rotor 24. Since the rotors are rotated in synchronism, groove 28 and slot 30 may be maintained in parallelism at all times and utilized for supporting the upper mirror of the viewing system, for rotation about a substantially horizontal axis passing through the center of the mirror. As illustrated in Fig. 2, the above-described groove and the slot are protected to some degree from damage by enemy fire by means of pairs of projections 32 and 34 formed on said rotors and extending along opposite sides of said groove and slot, the projections being extensions of the walls of the groove and slot, respectively, and shaped to eliminate right-angle corners where these walls intersect the exposed surfaces of the rotors. The elimination of such right-angle corners lessens the probability of damage through the closing up of the slot or the groove as a result of a direct hit on the rotors.

Since the angle of reflection of a plane mirror is always equal to the angle of incidence, it will be evident that with the mirror 10 mounted for rotation about its central horizontal axis, it will reflect, if positioned by suitable rotations about the above-mentioned axis, an image of any object within a large included angle along a single given path. Thus, a second mirror may be positioned at a fixed angle to the path of the reflected rays of the first mirror to reflect any image formed by that mirror to the eye of an operator within the turret. Since the path of the rays incident upon the second mirror is always the same, the path of the rays reflected from the second mirror will remain constant. In view of the above, the lower mirror 12 is supported within the turret in fixed relation to the viewing slit 20. In Fig. 1 of the drawings, the upper mirror 10 has been shown in two of its positions of rotation, and the paths of the principal rays for each of these positions have been indicated. Thus, the arrows in Fig. 1 correspond to the path of the principal rays when the upper mirror is in the position indicated by solid lines, while the heavy dashed line indicates the corresponding principal ray when the mirror is positioned as indicated by the dashed lines. In each case the reflected ray follows the path indicated by line $a-a'-a''$. It is possible, therefore, for the operator by looking along line $a'-a''$ to observe any object within a relatively large vertical field of view without moving his head relatively to the viewing device.

In its present application, the protectoscope is used in conjunction with a turret-mounted gun 36 (Fig. 1) for aiming purposes. In the turret mounting herein contemplated, the gun is mounted in the turret for adjustment relatively thereto in elevation only. In this type of installation, adjustments in azimuth are effected by revolving the entire turret, including the operator, gun, and, in this case, the protectoscope. Since the gun and protectoscope are fixed relatively to each other in the turret, it will be evident that the vertical field of fire of the gun in any orientation of the turret bears a fixed relation to the vertical field of view of the protectoscope, and, that, within certain limits, the elevation of the gun may be changed to bring it to bear on any object appearing in the protectoscope. Preferably, the gun and protectoscope are connected to move together in elevation in such manner that the gun is always trained upon the particular field covered by the protectoscope. For this purpose, means are provided for moving the protectoscope and gun in synchronism so that the line of sight of the protectoscope will always be in predetermined relation to the line of fire of the gun. In order to achieve this relation, it is necessary, after establishing any given relation between said line of sight and line of fire, only to rotate the mirror 10 of the protectoscope through just one-half the angle of rotation of the gun 36 about its trunnion axis 38. The following mechanism is provided for this purpose.

Cranks 40 and 42 are secured to the backs of the rotors 24 and 26 by means of dowels 44 and studs 46 (Fig. 2). Each crank 40, 42 has pivotally connected to it a link 48, the links 48 being pivotally connected at their opposite ends to cranks 50 fast to a cross-shaft 52. The links are of equal lengths and the cranks 40 and 42 are so positioned upon assembly of the parts that the rotors 24 and 26 are rotated in synchronism with the groove 28 parallel to slot 30. A sprocket 54 (Fig. 1) is secured to the cross-shaft and a similar sprocket 56 one-half the diameter of the sprocket 54 is secured to the trunnion axis of the gun 36. These sprockets are connected by a chain 58, an idler 60 being provided to maintain a uniform tension on the chain. Thus, any movement of the gun in elevation results in rotation of the upper mirror 10 through one-half the angle of movement of the gun about its trunnion axis, and the line of sight of the protectoscope therefore maintains a fixed relation to the line of fire of the gun. In the usual case, this relation is one of parallelism, although in certain instances it may be desirable to have the line of sight of the protectoscope and the line of fire of the gun intersect at a given distance from the gun to avoid aiming errors due to parallax.

In the construction herein shown, the upper mirror 10 is necessarily exposed to enemy fire from above and from the front of the armored enclosure. For this reason, there is a fair possibility that the mirror will be destroyed by enemy fire and that several replacement mirrors will be required in the course of an engagement. It is therefore desirable to provide means for replacing the upper mirror of the viewing system whenever it is destroyed preferably without exposing the operator to enemy fire, and preferably also irrespective of the orientation of the mirror about its horizontal axis. For the purpose in view, the slot 30 in the rotor 24 is arranged to extend all the way through the rotor and the associated crank 40 to provide communication with the interior of the turret. Thus, a new mirror may be placed in position by pushing it through the slot from inside the turret and into the groove on the exposed face of the opposite rotor 26. Preferably, and as illustrated, novel mirror-feeding means is provided utilizing a convenient source of supply for the mirrors such as a magazine 62 containing a plurality of replacement mirrors 10a. Since the capacity of the magazine is limited by the amount of available space, it is desirable to provide for the use of several such magazines interchangeably and, accordingly, a supporting frame 66 for the magazine is preferably so constructed that, when the mirror supply of one magazine is exhausted, another may be quickly substituted in its place. Since replacement mirrors must be fed irrespective of the orientation of rotors 24 and 26, it is also necessary that the magazine 62 rotate therewith.

As herein shown, the frame 66, arranged for replaceably supporting any one of a plurality of magazines 62, is secured at one end to the rotor 24 by means of studs 46 and rotates therewith. A bore 67 in the other end of the frame in axial alinement with the rotors 24, 26 is arranged to receive the reduced end portion 68 of a plug 70, thus forming a bearing for the frame as it rotates with the rotor. Finished surfaces 72 (Fig. 5) on the frame 66 are arranged to engage the top and bottom faces of the magazine, the right-hand end portion of which extends in a slot 73 formed in the crank 40. For holding the magazine in place in the frame and for locating it in proper relation to the slot 30 in rotor 24 and the crank 40, there is provided a handle 76 arranged to engage the vertical portion 74 of a T-slot 75 formed in the frame. Secured to the handle 76 is a spring-steel tongue 78. As indicated in Figs. 2 and 3, the spring tongue is separated from the body of the magazine 62 by the handle the thickness of which is slightly less than the height of the vertical portion 74 of the T-slot. The edges of the vertical portion 74 first contacted by the tongue are relieved slightly to facilitate introduction of the tongue 78. Thus, when the tongue is forced into the T-slot, it is bent transversely as shown in Figs. 2 and 3. This bending action tensions the spring sufficiently to clamp the magazine firmly in position. As above set forth, the magazine is arranged to contain a plurality of replacement mirrors 10a. A spring-pressed plate 80 urges these mirrors toward the bottom of the magazine, and wall portions 82, 84 and 86 (Figs. 3 and 4) so limit their movement that the lowermost of them, 10b, is maintained in alinement with slots 88 cut in wall portions 82. These slots are so located that, when the magazine is properly positioned in the frame member 66, as determined by surfaces 72 and T-slot 75, they are in alinement with the slot 30 extending through the rotor 24. Thus, the lowermost mirror may be ejected from the magazine and pushed into operating position between rotors 24 and 26.

For feeding replacement mirrors from the magazine 62 into operative position between the rotors, a hand-operated reciprocating pusher mechanism is provided. Space limitations within the turret necessitate the use of a two-cycle feeding operation such that forward and rear pushers are required. Accordingly, forward pusher 90 and rear pusher 92 (Fig. 4) are carried on a pusher block 94 which is guided for reciprocal movement by a pair of parallel rods 96 carried by the frame 66. The forward pusher is supported by a spring-steel leaf 98 which continually urges it upwardly toward the lowermost mirror 10b in the magazine and, as shown in Fig. 4, a pair of wings 100 are secured to the forward pusher and are bent slightly downwardly from the body thereof. When a magazine 62 is inserted in the frame 66, one of these wings engages the advancing wall of the magazine and depresses the forward pusher so that it is carried into operative position beneath the lowermost mirror 10b.

After a magazine 62 containing replacement mirrors 10a has been placed in the frame 66, the following operations, illustrated in Figs. 5 through 8, must be performed to move the lowermost mirror in the magazine into operative position between the rotors 24 and 26. The pusher block 94 is moved to the left as far as it will go by means of the handle 102. This allows the rear pusher 92 to move beyond the end of the mirror 10b which then drops into the position shown in Fig. 5. The pusher block is then moved as far as possible to the right, carrying the mirror 10b to the position indicated in Fig. 6, the movement in this direction being limited by contact of the wings 100 with the left-hand face of crank 40. At this point, the direction of movement is reversed and the pusher block is carried to the left far enough to permit the forward pusher 90 to be moved upwardly into position to engage the rear end of the mirror 10b. The pusher block is again moved to the right until wings 100 again come in contact with crank 40. At the conclusion of this movement, the mirror has been completely ejected from the magazine, but, as shown in Fig. 7, it has not been firmly seated in groove 28 in the face of the rotor 26. The next mirror 10c in the magazine is utilized to carry the mirror 10b into its final position and thereafter to hold it yieldingly in engagement with the slot 28 in the rotor 26. For this purpose, the pusher block is provided with a spring plunger 104 which is arranged to make contact with shoulder 68 when the pusher block has reached the limit of its normal movement to the left. Further movement of the pusher block is accomplished through the compression of spring 106 and allows the rear pusher 92 to move beyond the end of mirror 10c which drops into position in front of it under the influence of spring-pressed plate 80. When the pusher block is released, the spring plunger drives it a short distance to the right, as indicated in Fig. 8, the mirror 10c transmitting this motion to the mirror 10b in carrying it into its final operative position. The various parts of the feeding mechanism are so arranged that, when the mirror is in its final position, spring 106 is still under compression. Thus, a continuing pressure in the direction of feed is maintained on the mirror, tending to hold it firmly seated in groove 28. This continuing pressure serves also to eject fragments of mirror 10b from slot 30 after the mirror has been broken by enemy fire.

Figure 10:
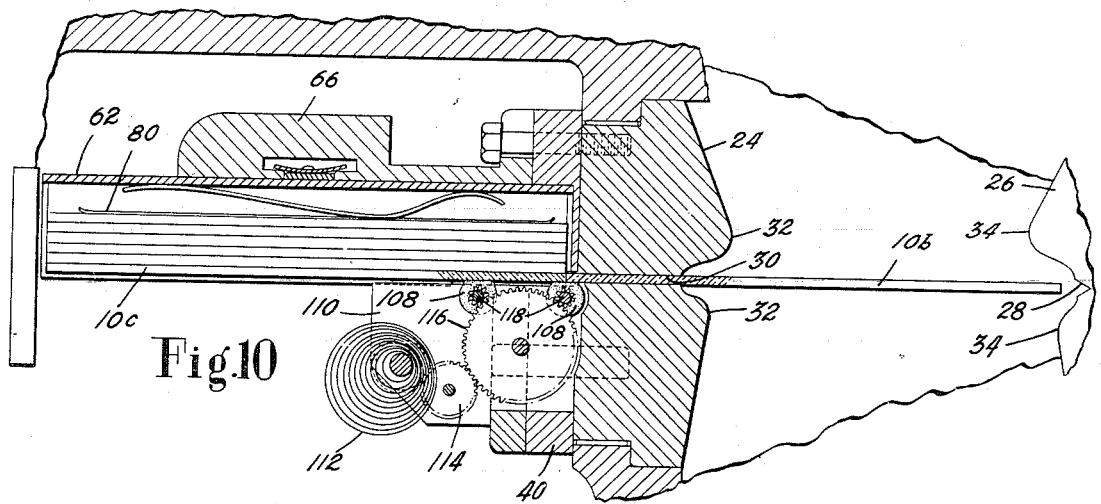
Fig. 10 is a sectional view showing an optional form of drive for feeding mirrors from the magazine.

Fig. 10 of the drawings illustrates a modified feeding mechanism which may be used in conjunction with the protectoscope and the magazines, above described, for automatically feeding replacement mirrors into position whenever needed. In the modification shown, the hand-operated pusher is replaced by a pair of rubber covered feed rolls 108 which are rotatably mounted on an extension 110 of the frame 66, the feed rolls being held in contact with the lowermost mirror in the magazine 62. A clock spring 112 is utilized to drive the feed rolls through gears 114, 116 and 118. The spring is wound after a magazine 62 has been inserted in the frame 66 and thereafter tends at all times to rotate the feed rolls. Under the action of the rolls 108, mirror 10b is fed entirely out of the magazine, after which mirror 10c drops into the position shown in Fig. 10. Further rotation of the feed rolls under the action of spring 112 urges mirror 10c along the line of feed until it has pushed mirror 10b into operative position between rotors 24 and 26. Rotation of the feed rolls is thereafter prevented by the presence of mirrors 10b and 10c, the spring 112 acting through the rolls and mirror 10c to exert an endwise pressure on mirror 10b to hold it in operative position. As soon as mirror 10b is removed, however, as by destruction by enemy fire, the feed rolls are free to drive mirror 10c into operative position, repeating the cycle above described. The operation of this feeding mechanism is entirely automatic and replacement mirrors are fed into operative position whenever needed until the supply in magazine 62 is exhausted. The mechanism further functions to hold the mirror which is in operative position firmly seated in groove 28 in much the same manner as does the spring plunger 104 of the hand-operated feeding mechanism previously described.

While the above-described feeding mechanisms make possible replacement of the upper mirror 10 without exposure of the operator, it is necessary to provide means for protecting him from spatter, shots from above, particles of flying glass, and other missiles which may enter the turret through the viewing slit 20. For this purpose, a spatter trap 120 is provided. As indicated in Figs. 1 and 2, this spatter trap is located within the turret just beneath the viewing slit 20 and extends around the lower mirror 12. The spatter trap is shown herein as being substantially semicylindrical in shape and is pivotally mounted for rotation about pin 122 which extends through portions of the casting 22 and engages a lug 124 formed on the spatter trap casting. The semicylindrical shape is chosen because it tends to deflect spatter and other particles entering the slit 20 along a semicircular path which carries them back toward the slit through which they entered and away from the eye of the operator. A heavy safety-glass window 126 is received in grooves 128 in the wall of the spatter trap to enable the operator to examine the image formed by the lower mirror 12 from within the turret. As shown herein, the spatter trap is arranged to support the lower mirror 12 of the periscopic viewing system. To this end, slots 130 are provided in the walls thereof and are arranged to hold the mirror in the proper angular relation to the viewing slit. Springs 132 (Fig. 1) clip the mirror 12 in position. The spatter trap normally occupies the position shown in Fig. 1 and is secured against pivotal movement by a suitable catch 134. If desired, the catch may be released and the spatter trap swung back, pivoting about pin 122 to permit removal of shell fragments or particles of broken glass and the cleaning or replacement of the lower mirror. In some cases, large shell fragments, rocks, or other foreign bodies may become lodged in or above viewing slit 22, thereby rendering observation impossible. Accordingly, the spatter trap 120 is arranged so that it may be removed entirely by withdrawing pin 122 by means of its handle 136 into the cored-out portion of casting 22, indicated at 137 (Fig. 2). When this has been accomplished, the viewing slit may be cleared from within the armored enclosure.

In the illustrated device, the mirrors 10 and 12 forming the periscopic viewing system are of appreciable width and cover a fairly broad field of view which may amount to 10 degrees or more, depending upon the position of the observer's eye. While such a broad field of view is ideal for observation purposes and preliminary aiming, it does not provide a satisfactory reference mark for final aiming adjustments. It is therefore necessary to make some provision for accurate sighting and, for this purpose, a sight, such as cross-hair telescope 138 (Fig. 1), is mounted inside the turret and is arranged to be moved into sighting position for accurate aiming at objects discovered in the field of the protectoscope during routine observation. Preferably, and as shown, the telescope 138 is mounted upon a carrier 140 which is supported for sliding movement widthwise of the fixed elements of the viewing device by a dovetail slide 142 which moves in a slideway 144 cut in casting 22 and extending widthwise of the viewing device. A gib 146 forms one wall of slideway 144 and permits removal of slide 142. Detents 148 are provided to lock the slide at its limits of travel thereby holding the sighting telescope in either the sighting position or in an inoperative position out of the line of sight. This latter position of the slide and telescope is such that they do not interfere with the opening of spatter trap 120. As indicated in Fig. 1 of the drawings, telescope 138 is secured to carrier 140 by means of screws 150. Thus, the telescope may be removed and other types of sights substituted if desired.

In order to make possible accurate sighting in spite of the lurching movements of the tank, means are provided for assisting the operator to steady himself relatively to the fixed elements of the viewing device, and the above-described sight. In the present device, such means takes the form of an adjustable sponge-rubber-lined head clamp 152 (Fig. 1) the size of which may be altered to meet individual requirements by loosening wing nut 154 and moving side pieces 156 relatively to the top piece 158. This head clamp is carried by a slide 160 (Fig. 11) mounted for movement widthwise of the viewing device on a rod 162 rotatably mounted in the arms 164 (Fig. 2) of a U-shaped frame member 166 which is secured to the casting 22, as indicated in Fig. 1. The slide and the head clamp are freely movable laterally of the viewing device through axial movement along the rod 162 and may also rotate about the rod. The slide 160 straddles a guide rod 168 carried in a pair of arcuate slots cut in the arms 164, the centers of curvature of said slots being coincident with the axis of the rod 162. The rod 162 and the guide rod 168 extend at both ends beyond the arms of the frame member and are held in clamp blocks 170 by means of set screws 172. Springs 174 acting between extensions 176 on the clamp blocks and projections on the frame member 166 serve normally to maintain the above-described elements in the positions shown in Fig. 11 with the guide rod 168 at one limit of its motion in the arcuate slots. A web 178 extends across the base of the U-shaped frame member substantially perpendicular to the same, a portion of the web being cut away to form an inclined surface 180 (Fig. 1). The bottom face of the slide 160 has an inclined surface 182 formed thereon, the pitch of this inclined surface being slightly greater than that of the inclined surface 180 so that said surfaces bind when they are brought forcibly into engagement with each other. When the various parts occupy the positions indicated in Fig. 11, these inclined surfaces are maintained out of contact and thus do not prevent free sliding movement of the slide 160 along the rod 162. Should the operator desire to lock the slide in any position to which it has been moved along that rod, thereby to steady himself for aiming or for any other purpose, he may by a slight tipping movement of his head rotate the slide about rod 162 against the pressure of the springs 174. Such rotation of the slide binds or jams the inclined surfaces 180 and 182 together, thus effectively locking the slide in the position into which it has been moved by the operator against movement along the rod.

In the operation of the illustrated protectoscope, with the cross-hair telescope 138 in the inoperative position, thus affording the operator a clear view of the entire field of the viewing system, the operator scans the area surrounding the tank by rotating the turret in which the device is mounted. At the same time he changes the orientation of the upper mirror 10 to adjust the vertical field of view. It will be understood that the operator may move his head relatively to the viewing system by sliding the head clamp 152 along the rod 162 to extend slightly his lateral field of view without rotating the turret. When a target is discovered the telescope 138 is moved into sighting position and the head clamp is locked through the operation of the previously-described locking means. Thereafter minute adjustments of the turret and the upper mirror 10 are made to bring the cross-hairs of the telescope onto the target. When this condition is achieved, the gun 36 which has been moved in synchronism with the device as above described and which bears a fixed relation thereto is properly trained on the target and may be fired. It will be understood, of course, that if the viewing device is to be used independently of any gun, upper mirror 10 may be rotated by a suitable handle or other means acting on sprocket 50.

Having thus described our invention, what we claim as new and desire to secure by Letters Patent of the United States is:

1. In a turret having a gun mounted for swinging movement about a trunnion axis, the combination of said gun with a periscopic viewing device fixed in the turret and having its line of sight in predetermined relation to the gun, said device comprising a first reflecting element outside the turret, carriers for said first reflecting element rotatable about an axis parallel to the trunnion axis of said gun, a second reflecting element, means operatively connected with said gun for rotating said carriers through an angle equal to one-half the angle of swinging movement of said gun about its trunnion axis, and means constructed and arranged to engage said first reflecting element only and to move it from within the turret into its carriers, said carriers being arranged to support said first reflecting element in target reflecting position during the movement of said reflecting element into its carriers.

2. In an armored turret, a turret wall having a pair of outwardly bulging portions defining the ends of a viewing slit therein, holding means rotatably mounted in said outwardly bulging portions and positioned partly within and partly without the armored enclosure, said holding means being constructed and arranged to support one mirror of a periscopic viewing system, said holding means including a head provided with a slot providing a passage through which said mirror is transferred from within to without the armored enclosure, and a second mirror supported within the turret in fixed relation to said viewing slit and forming the other half of the periscopic viewing system.

3. In a turret having a gun mounted for swinging movement about a trunnion axis extending transversely of the gun, the combination with said gun, of a periscopic viewing device comprising an exposed reflecting element which is mounted outside the turret for rotation about an axis parallel to the trunnion axis of said gun and adjacent to an opening in the turret wall, means for supporting a magazine of reflecting elements within the turret, a concealed reflecting element supported inside the turret in fixed relation to said opening, holders for said exposed reflecting element, means driven by the gun for rotating said holders, and means located within the turret for selecting a reflecting element from said magazine and inserting it into said holders.

4. In a gun turret, a periscopic viewing system, a turret wall having a pair of outwardly bulging portions defining the ends of an opening therethrough, a pair of rotors oppositely disposed in and extending through the walls of said bulging portions for supporting one mirror of said periscopic viewing system for rotation about a substantially horizontal axis, and one of said rotors having a diametrically disposed slot therein communicating with the interior of said turret to permit ready replacement of said upper mirror in any position of rotation of said rotors.

5. In a turret having a gun mounted for swinging movement about an axis extending transversely of the gun, the combination with said gun, of a periscopic viewing device including a mirror located outside said turret adjacent to an opening through the turret wall, a pair of rotors for supporting said mirror, said rotors being mounted in outwardly bulging portions of the turret wall for rotation about an axis parallel to the axis of swinging movement of the gun to vary the position of the mirror in accordance with swinging movements of the gun to cause the line of sight of the device to be maintained in predetermined relation to the longitudinal axis of the gun, one of said rotors having a diametrically disposed slot formed therein communicating with the interior of said turret, mirror-engaging rolls, and a spring for operating said rolls thereby to insert a mirror through said slot into said rotors, said rotors being arranged, during the mirror inserting operation, to support said mirror in target reflecting position.

6. In an armored turret, a periscopic viewing system, a turret wall having a pair of outwardly bulging portions defining the ends of an opening therethrough, a pair of rotors oppositely disposed in and extending through the walls of said bulging portions for supporting one mirror of said periscopic viewing system, one of said rotors having a diametrically disposed slot therein communicating with the interior of said turret, the other of said rotors having a diametrically disposed groove therein, means for synchronously rotating said rotors with said groove parallel to said slot, and means within the turret for feeding a mirror through said slot into said groove.

7. In an armored turret, a periscopic viewing system, a turret wall having a pair of outwardly bulging portions defining the ends of an opening therethrough, a pair of rotors oppositely disposed in and extending through the walls of said bulging portions for supporting the upper mirror of said periscopic viewing system, one of said rotors having a diametrically disposed slot therein communicating with the interior of said turret, the other of said rotors having a diametrically disposed groove therein, means for synchronously rotating said rotors with said groove parallel to said slot, and means within the turret for feeding a mirror through said slotted rotor and into engagement with said other rotor in said groove and for thereafter maintaining a continuing pressure on said mirror to hold it against endwise displacement.

8. In an armored turret, a periscopic viewing device comprising an upper reflecting element exposed to enemy fire and a lower reflecting element mounted within the turret, the turret having an opening between said elements, a hinged spatter trap within the turret and below said opening, a window in said trap facing the lower reflecting element, a sight located within said turret, and a carrier for said sight constructed and arranged to move the sight from a position in which it is focused through the window on the lower reflecting element into a remote position permitting the spatter trap to swing downwardly into open position.

9. The combination with a periscopic viewing device of a head rest for supporting the head of an observer when using said device, a carrier on which said head rest is secured, a rod on which said carrier is mounted for bodily sliding movement in opposite directions widthwise of said viewing device and for tipping movements toward and from said viewing device, and means for locking said carrier against bodily sliding movement, said locking means being characterized by relatively movable binding surfaces arranged to be brought into binding engagement with each other in any position of the carrier widthwise of the viewing device by such tipping movement of the carrier.

10. In an armored turret, the combination with a periscopic viewing device mounted in said turret of a head rest for supporting the head of an observer when using said viewing device, a carrier for said head rest, a rod on which said carrier is mounted for bodily sliding movement in opposite directions widthwise of said viewing device and for tipping movements toward and from said viewing device, and a member secured to the turret and arranged to support said rod, said member having formed thereon a surface coextensive with said rod and arranged by binding engagement with a surface on said carrier to lock the carrier against sliding movement relatively to said rod.

11. In a gun turret, a periscopic viewing system, a turret wall having a pair of outwardly bulging portions defining the ends of an opening therethrough, a pair of rotors oppositely disposed in and extending through the walls of said bulging portions for supporting one mirror of said periscopic viewing system for rotation about a substantially horizontal axis, one of said rotors having a diametrically disposed slot therein communicating with the interior of said turret, and means located within the turret and rotatable with said rotors for feeding mirrors through said slot into position to be supported by said rotors in any position of rotation of the rotors.

12. In an armored turret, a periscopic viewing system one reflecting element of which is located outside the turret, means for supporting said reflecting element including a member having formed therein a slot communicating with the interior of the turret to allow replacement of said reflecting element, a frame member within the turret arranged to receive a magazine for supporting a plurality of said reflecting elements, said frame member being provided with a T-slot, and a spring tongue on said magazine arranged to cooperate with the frame member in said T slot to clamp the magazine against the frame member with the endmost reflecting element in said magazine in alinement with the slot in said supporting member.

13. In a gun turret, a periscopic viewing system, a turret wall having a pair of outwardly bulging portions defining the ends of an opening therethrough, a pair of rotors oppositely disposed in and extending through the walls of said bulging portions for supporting one reflecting element of said periscopic viewing system for rotation about a substantially horizontal axis, one of said rotors having a diametrically disposed slot therein communicating with the interior of the turret, a magazine for said reflecting elements located within said turret in operative relation to said slotted rotor, and means for feeding the endmost reflecting element in said magazine through said slotted rotor and into position to be supported by said rotors.

14. In a gun turret, a periscopic viewing system having one reflecting element rotatably mounted outside said turret, a pair of rotors for supporting said reflecting element and for rotating it about a substantially horizontal axis, one of said rotors having a diametrically disposed slot therein communicating with the interior of said turret, a frame member within the turret, said frame member being rotatable with said rotors and being arranged to receive different mirror-containing magazines and movable to support each magazine in proper relation to said slotted rotor, and mirror-feeding means mounted on said frame member.

15. In a gun turret, a periscopic viewing system having one reflecting element rotatably mounted outside said turret, a pair of rotors for supporting said reflecting element and for rotating it about a substantially horizontal axis, one of said rotors having a diametrically disposed slot therein communicating with the interior of said turret, a magazine containing a plurality of reflecting elements located within the turret, a frame member rotatable with said rotors for supporting said magazine with the endmost reflecting element therein in alinement with said slotted rotor, and feeding means for said reflecting elements, said feeding means including a member slidably mounted on said frame member and movable at will by the operator to feed the endmost reflecting element in said magazine through said slotted rotor into operative position outside said turret.

16. In a gun turret, a periscopic viewing system having one reflecting element rotatably mounted outside said turret, a pair of rotors for supporting said reflecting element and for rotating it about a substantially horizontal axis, one of said rotors having a diametrically disposed slot therein communicating with the interior of said turret, a magazine containing a plurality of reflecting elements located within the turret, a frame member rotatable with said rotors for supporting said magazine with the endmost reflecting element therein in alinement with said slotted rotor, feeding means for said reflecting elements, said feeding means including a member slidably mounted on said frame member and movable at will by the operator to feed the endmost reflecting element in said magazine through said slotted rotor into operative position outside said turret, and means tending normally to move said feeding member in the direction of feed to cause each reflecting element when in operative position to be held against endwise displacement by engagement of the next succeeding reflecting element therewith.

17. In combination with an armored enclosure, a periscopic viewing device, said device comprising a frangible reflecting element located outside the enclosure and movable to adjust the line of sight of said device, and a second reflecting element supported within the enclosure, a source of replacement reflecting elements, and means operating automatically to feed a replacement reflecting element from said source into operative position whenever the first-mentioned reflecting element is broken, said means comprising a pair of feed rolls constructed and arranged for frictional engagement with said replacement reflecting element and an actuator for rotating said rolls to feed said element into reflecting position.

18. In a gun turret, a periscopic viewing system, a turret wall having a pair of outwardly bulging portions defining the ends of an opening therethrough, a pair of rotors oppositely disposed in and extending through the walls of said bulging portions for supporting one mirror of said periscopic viewing system for rotation about a substantially horizontal axis, one of said rotors having a diametrically disposed slot therein communicating with the interior of said turret, a frame member within the turret and rotatable with said rotors, said frame member being arranged to support a mirror-containing magazine, a pair of feed rolls for urging successive mirrors from said magazine into operative position, and an actuator supported on said frame member and arranged to drive said feed rolls.

19. In a gun turret, a turret wall having a pair of outwardly bulging portions defining the ends of an opening therethrough, a pair of rotors oppositely disposed in and extending through the walls of said bulging portions, a diametrically disposed slot in one of said rotors and a diametrically disposed groove in the other of said rotors arranged to support for rotation the upper mirror of a periscopic viewing system, said slot extending through the rotor and communicating with the interior of the turret to allow replacement of said mirror, and means protecting said slot and groove from damage by enemy fire, said means comprising protuberances formed on said rotors and extending along opposite sides of said slot and groove respectively, said protuberances being extensions of the walls of said slot and groove shaped to eliminate right-angle corners where said walls intersect the surfaces of said rotors.

20. In an armored enclosure, a periscopic viewing device comprising a fixed reflecting element mounted within the armored enclosure, an adjustable reflecting element positioned outside the wall of said enclosure, rotary holders in which said adjustable reflecting element is mounted, a magazine for holding a plurality of reflecting elements, means for mounting said magazine on one of said rotary holders, and means for individually feeding said reflecting elements from said magazine into reflecting position in said holders.

CHARLES C. BELL.
WILLIAM V. GOODHUE.